United States Patent

Duling et al.

[15] 3,648,531

[45] *Mar. 14, 1972

[54] FRICTION OR TRACTIVE DRIVE FLUID

[72] Inventors: Irl N. Duling, West Chester; David S. Gates, Swarthmore, both of Pa.; Robert E. Moore, Wilmington, Del.; Frederick P. Glazier, Chester, Pa.

[73] Assignee: Sun Oil Company, Philadelphia, Pa. by said Duling, said Gates and said Moore

[ * ] Notice: The portion of the term of this patent subsequent to Aug. 3, 1988, has been disclaimed.

[22] Filed: Aug. 19, 1969

[21] Appl. No.: 3,256

[52] U.S. Cl. ................................74/200, 252/52, 252/59, 252/73, 260/666 M
[51] Int. Cl. ..............................F16h 15/08, C09k 3/00
[58] Field of Search ........................252/73–79, 54, 252/54.6, 59, 52; 260/666 M; 208/18, 19; 74/200

[56] References Cited

UNITED STATES PATENTS

| 3,411,369 | 11/1968 | Hammann et al. | 74/200 |
| 3,440,894 | 4/1969 | Hammann et al. | 74/200 |
| 3,382,288 | 5/1968 | Schneider | 260/666 |
| 3,398,165 | 8/1968 | Duling et al. | 260/410 |

*Primary Examiner*—Leon D. Rosdol
*Assistant Examiner*—Harris A. Pitlick
*Attorney*—George L. Church, Donald R. Johnson, Wilmer E. McCorquodale, Jr. and Barry A. Bisson

[57] ABSTRACT

A friction or tractive drive comprises at least two relatively rotatable members in torque transmitting relationship, the tractive surfaces of the members having disposed thereon a tractant selected from the following groups (A) or (B):

A. a tractant comprising a hydrocarbon dimer of an alkyladamantane and/or alkyladamantanol of the $C_{12}$–$C_{19}$ range containing one to three alkyl groups of the $C_1$–$C_3$ range, the dimer containing two adamantane nuclei which are linked to each other through an alkylene radical derived from and having the same number of carbon atoms as an alkyl group of the starting material; and B. an ether analogous to a hydrocarbon dimer from group A.

9 Claims, No Drawings

FRICTION OR TRACTIVE DRIVE FLUID

CROSS REFERENCES TO RELATED APPLICATIONS

The present application is copending with the following listed applications, all of which are assigned to the Sun Oil Company, to whom the present application is also assigned: Ser. No. 621,443 filed Mar. 8, 1967 and now abandoned in view of continuation-in-part Ser. Nos. 78,190 and 78,191, both filed Oct. 5, 1970; Ser. No. 679,801 filed Nov. 1, 1967 and now U.S. Pat. No. 3,597,358, issued Aug. 3, 1971; Ser. No. 679,833 filed Nov. 1, 1967 and now U.S. Pat. No. 3,595,796, issued July 27, 1971; Ser. No. 679,834 filed Nov. 1, 1967 and now U.S. Pat. No. 3,595,797, issued July 27, 1971; Ser. No. 679,851 filed Nov. 1, 1967 and now U.S. Pat. No. 3,598,740, issued Aug. 10, 1971; Ser. No. 784,487 filed Dec. 17, 1968; Ser. No. 812,516 filed Feb. 19, 1969; Ser. No. 823,138 filed on May 8, 1969 and now U.S. Pat. No. 3,560,578, issued Feb. 2, 1971; Ser. No. 850,717 filed Aug. 18, 1969; Ser. No. 794,844 filed Jan. 24, 1969 and Ser. No. 851,488 filed Aug. 19, 1969.

The disclosure of all of the above-referred to applications is hereby incorporated herein by reference, particularly as to disclosure therein directed to the preparation of compounds containing one or more adamantane nuclei, to the preparation of hydrogenated petroleum oils, saturated cyclic hydrocarbon oils or branched chain acyclic hydrocarbon oils and to the blending of hydrocarbon components to produce traction fluids. Said Ser. No. 851,488 has been abandoned in view of Ser. No. 056,680, filed July 20, 1970. Said continuation-in-part application Ser. No. 056,680 corrects a misidentification of the ether products described in the present application. That is, in the continuation application, ether products are disclosed as being of the following forms (omitting methyl substituents):

Trans-type          Cis-type

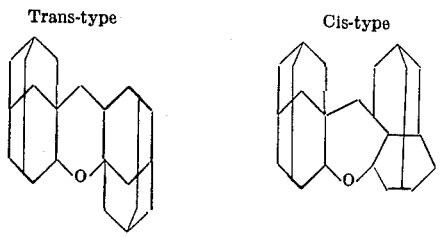

BACKGROUND OF THE INVENTION

Friction or traction drive systems the transmission of power and testing equipment for determination of the traction coefficient have been described in numerous prior art references. See, for example, the following:
1. Rounds, U.S. Pat. No. 3,394,603 dated July 30, 1968
2. Hammann and Schisla, U.S. Pat. No. 3,411,369 dated Nov. 19, 1968
3. Hammann and Schisla, U.S. Pat. No. 3,440,894 dated Apr. 29, 1969
4. F. G. Rounds, *J. OF CHEM. AND ENG. DATA*, Vol. 5, No. 4, pps. 499–507 (Oct., 1960)
5. Hewko, Rounds and Scott, *Proceeding of the Symposium on Rolling Contact Phenomena*, pps. 157–185, Elsevier Publishing Co., Amsterdam (1962)
6. Almen, J.O., U.S. Pat. No. 2,045,555
7. Hewko, *Roller Traction Drive Unit for Extremely Quiet Power Transmission*, AIAA Paper 67–429

The previously cited copending parent application, Ser. No. 679,801, filed Nov. 1, 1967 is directed generically to the use of adamantane compounds as traction fluids or as components of traction fluids.

SUMMARY OF THE INVENTION

A friction or tractive drive comprising at least two relatively rotatable members in torque transmitting relationship, the tractive surfaces of said members having disposed thereon a tractant selected from the following groups (A) or (B):

A. a tractant comprising a hydrocarbon dimer of an alkyladamantane and/or alkyladamantanol of the $C_{12}$–$C_{19}$ range containing one to three alkyl groups of the $C_1$–$C_3$ range said dimer containing two adamantane nuclei which are linked to each other through an alkylene radical derived from and having the same number of carbon atoms as an alkyl group of the starting material; and, B. an ether analogous to a hydrocarbon dimer from group A.

As can be seen from the previously cited references, special properties are required of the traction fluids used in friction drive systems. One desired property is a high coefficient of traction as measured, for example, by the test procedure described in reference 4 supra. As shown therein, most materials have traction coefficients (measured at 200° F., 400,000 p.s.i. and at a bearing speed of 600 ft./min.) less than 0.06, with the values for hydrocarbons usually falling in the range of 0.03–0.05. In comparison, bis-type products of the invention of the above-referred to application of Moore and Schneider, including the ethers as well as the hydrocarbon dimers, generally have traction coefficients measured in this manner in the neighborhood of 0.06 or higher. They are thus particularly valuable as traction fluids or as additives for improving the traction coefficients of known types of traction fluid compositions. The liquid bis-type products are preferred for this purpose, but those which are normally solids also can be used to the extent that they are substantially soluble in the base fluid at the temperatures and pressures at which it is required to operate in the friction drive system.

Especially useful traction fluids comprise 5–95 percent by volume of one or more such dimer isomers and 95–5 percent of an acyclic branched chain fluid polymer of a $C_3$–$C_8$ monoolefin, said fluid polymer having, preferably, a SUS viscosity at 100° F. in the range of 20–2000 SUS, and more preferably an ASTM viscosity index in the range of 30–160.

FURTHER DESCRIPTION

As is disclosed in the above-referred-to copending application of Moore and Schneider, alkyladamantanes and/or alkyladamantanols of the $C_{12}$–$C_{19}$ range having one to three alkyl substituents of the $C_1$–$C_3$ range (i.e., methyl, ethyl, n-propyl or isopropyl) can be reacted to form bis-type products by contacting the feed reactant with strong sulfuric acid having a strength in the range of 94–102 percent $H_2SO_4$ equivalent by weight, more preferably 96–100 percent $H_2SO_4$. The temperature of contacting is between the freezing point of the sulfuric acid and 100° C., more preferably in the range of 10°–75 C. These conditions cause the alkyladamantane feed compounds to react in a manner to form dimer hydrocarbon products having two adamantane nuclei linked through an alkylene radical corresponding to an alkyl group of the feed component. In other words, the linkage moiety between the nuclei can be represented by —R—, wherein R is an alkylene radical having the same number of carbon atoms as an alkyl substituent of the starting compound. If the latter contains only methyl substituents, the resulting linkage is attached to a nonbridgehead carbon of one of the nuclei and a bridgehead carbon of the other; whereas if an ethyl or propyl substituent is present, the resulting ethylene or trimethylene linkage is attached only to bridgehead positions of the linked nuclei.

When the feed material contains a dimethyladamantane, dimethyladamantanol, ethyldimethyladamantane or ethyldimethyladamantanol, another bis-type product is also obtained which is an ether.

Many of the bis-type products of the present process, including both the dimer hydrocarbons and the ethers, are oils at room temperature and exhibit unusually high traction coefficients. They are particularly useful as components of traction fluids for use in friction drive or toric transmission systems. Some of the bis-bype products (in pure form) have sufficient symmetry to be relatively high melting solids, and these can have utility as components in traction fluids containing a solubilizing agent, such as a fluid naphthene hydrocarbon, or a fluid branched paraffin or olefin acyclic hydrocarbon or a mixture of naphthene and acyclic hydrocarbons.

Suitable components for blending with the adamantane dimers or dimer-ethers of the Moore and Schneider application, in order to produce improved, blended traction fluids are those hydrogenated hydrocarbon oils and saturated cyclic and acyclic hydrocarbons described in the above-referred to copending patent applications, Ser. Nos. 679,801; 679,833; 679,834; 679,851 and 794,844. Particularly useful fluids for such blending are (1) hydrogenated naphthenic or paraffinic oils containing no more than 1 weight percent of "gel" aromatics, (2) $C_{12}$–$C_{70}$ organic liquids having at least one saturated ring and having a coefficient of traction of at least 0.06 as defined in French Pat. No. 1,541,833 (also U.S. Pat. No. 3,440,894), (3) a fused saturated component having from two to nine fused rings and a total carbon content of from about nine to about 60 as described in U.S. Pat. No. 3,411,369, (4) liquid hydrocarbon having an acyclic structure with at least three quaternary carbon atoms, as described in French Pat. No. 1,541,833 (see also U.S. Pat. No. 3,440,894), (5) members of groups (2) to (4) inclusive wherein up to eight carbon atoms are replaced by atoms selected from the group consisting of oxygen, nitrogen, phosphorous and silicone (e.g., see U.S. Pat. No. 3,411,369, U.S. Pat. No. 3,440,894, and French Pat. No. 1,541,833.

ILLUSTRATIVE EXAMPLES

EXAMPLE I

Traction coefficients for dimer isomers and ether isomers obtained from DMA (dimethyladamantane) and/or DMA-OL are extraordinarily high. Mixtures of these dimer isomers and ether isomers are oils of relatively high viscosity (e.g., about 3,000 SUS at 100° F.). For traction coefficients determined by the method described by Rounds, reference (4) supra, at a bearing speed of 600 ft./min., 400,000 p.s.i. and 200° F., values as shown below are typical. For purpose of comparison, the traction coefficients determined in like manner for several other materials are also listed.

| | |
|---|---|
| dimer mixture from DMA | 0.063 |
| ether mixture from DMA | 0.059 |
| polypropylene | 0.046 |
| polybutene | 0.051 |
| naphthenic oil | 0.047 |
| diamyl naphthalene | 0.048 |
| di-2-ethylhexyl sebacate | 0.036 |
| ethyl ricinoleate | 0.030 |

These date illustrate the fact that both the dimer and ether products provided by the invention of Moore and Schneider have remarkably high coefficients of traction and hence are particularly valuable as components of traction fluids.

EXAMPLE II

A blend was made of 40 volume percent of the dimer mixture from DMA and 60 percent of a substantially fully hydrogenated polybutene polymer. The traction coefficient (by the Rounds method) at 600 ft./min., 400,000 p.s.i. and 200° F. was 0.059. This is the highest such coefficient which could be obtained from blends of 10 to 90 percent of the dimer and 90 to 10 percent of the hydrogenated polybutene. This 40/60 blend also had good fluid properties (as listed below):

| | |
|---|---|
| kv. 210 | 5.96 cs. |
| kv. 100 | 54.64 |
| ASTM VI | 33 |
| ITF VI | 26 |
| Brookfield 0° F. | 7,460 |

The invention claimed is:

1. In a friction or tractive drive comprising at least two relatively rotatable members in torque transmitting relationship, the improvement wherein the tractive surfaces of said members have disposed thereon a hydrocarbon dimer of an alkyladamantane and/or alkyladamantanol of the $C_{12}$–$C_{19}$ range containing one to three alkyl groups of the $C_1$–$C_3$ range, said dimer containing two adamantane nuclei which are linked to each other through an alkylene radical derived from and having the same number of carbon atoms as an alkyl group of the starting material.

2. In a friction or tractive drive machine comprising at least two relatively rotatable members in torque transmitting relationship and comprising a power input member and a power output member in tractive rolling contact relationship and fluid film between said members, the improvement wherein said fluid film contains a hydrocarbon dimer of an alkyladamantane and/or alkyladamantanol of the $C_{12}$–$C_{19}$ range containing one to three alkyl groups of the $C_1$–$C_3$ range, said dimer containing two adamantane nuclei which are linked to each other through an alkylene radical derived from and having the same number of carbon atoms as an alkyl group of the starting material.

3. A drive according to claim 2 wherein said fluid film consists essentially of said dimer and branched paraffin hydrocarbon which is a fully hydrogenated polymer of $C_3$–$C_8$ olefin.

4. A drive according to claim 1 wherein said alkyladamantane and/or alkyladamantanol of the $C_{12}$–$C_{19}$ range is selected from the following group:

1,3- or 1,4- or 2,6-dimethyladamantane; 1- or 2-ethyl-adamantane; 1-ethyl-3-methyl- or 1-ethyl-4-methyladamantane; 1-methyl-4-ethyladamantane; 1- or 2-n-propyladamantane; 1- or 2-iospropyladamantane; 1-methyl-4-propyladamantane; 1,3,5- or 1,3,6-trimethyladamantane; 1,3- or 1,4-diethyladamantane; 1,3- or 1,4-dipropyladamantane; 1-ethyl-3,5-dimethyl- or 1,3-dimethyl- 6-ethyladamantane; 1,3,5-triethyladamantane; 1,3-diethyl-5-isopropyladamantane; 1,3,5-tripropyladamantane; and the alkyladamantanols corresponding to the foregoing hydrocarbons and having its hydroxy group located at a bridgehead or nonbridgehead position on the nucleus.

5. A drive according to claim 2 wherein said dimer consists essentially of i. syn-4-(3,5-dimethyl-1-adamantyl)methyl-1- methyladamantane, or
ii. anti-4-(3,5-dimethyl-1-adamantyl)methyl-1- methyladamantane or a mixture of i and ii.

6. A drive according to claim 2 wherein said fluid film consists essentially of at least one member of the following group:

1-(3-methyladamantyl-1)-2-(3'-methyl-5'-ethyladamantyl-1')ethane 1,2-bis(3-methyladamantyl-1)ethane 1,2-bis(3-methyl-5-ethyladamantyl-1)ethane.

7. A drive according to claim 2 wherein said fluid film consists essentially of at least one member of the following group:

syn-4-(3,5-dimethyl-1-adamantoxy)methyl-1- methyladamantane anti-4-(3,5-dimethyl-1-adamantoxy)methyl-1- methyladamantane.

8. A drive according to claim 2 wherein said fluid film consists essentially of 5 to 95 percent by volume of at least one said dimer and 95 to 5 percent of a acyclic branched chain fluid polymer of a $C_3$–$C_8$ mono-olefin, said fluid polymer having an SUS viscosity at 100° F. in the range of 20–2,000 SUS, and an ASTM viscosity index in the range of 30–160.

9. A tractant composition consisting essentially of 5 to 95 percent by volume of one or more hydrocarbon dimers of an alkyladamantane and/or alkyladamantanol of the $C_{12}$–$C_{19}$ range containing one to three alkyl groups of the $C_1$–$C_3$ range said dimer containing two adamantane nuclei which are linked to each other through an alkylene radical derived from and having the same number of carbon atoms as an alkyl group of the starting material and from 95 to 5 percent of an acyclic branched chain fluid polymer of a $C_3$–$C_8$ mono-olefin, said fluid polymer having an SUS viscosity at 100° F. in the range of 20–2,000 SUS and an ASTM viscosity index in the range of 30–160.

* * * * *